Figure 1:
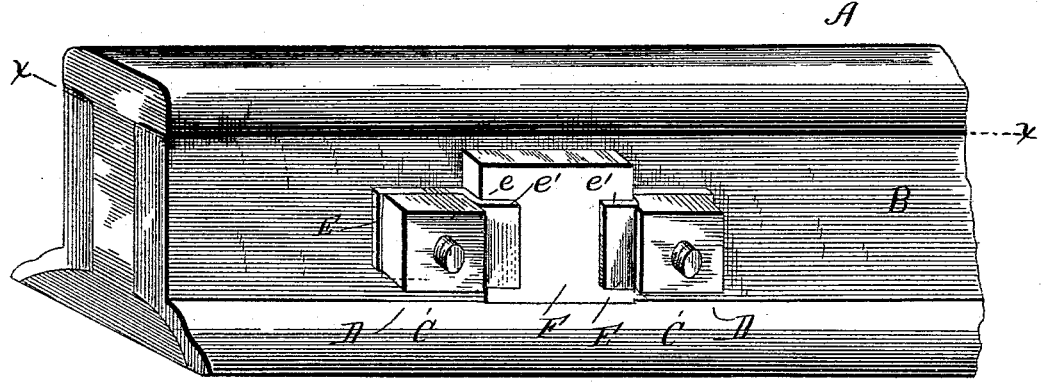

(No Model.)

D. STEINER.
NUT LOCK.

No. 373,697. Patented Nov. 22, 1887.

Witnesses
R. C. Laurie
Van Buren Hillyard

Inventor
David Steiner
By his Attorneys
R. S. V. A. T. Lacey

United States Patent Office.

DAVID STEINER, OF ADAMSBURG, PENNSYLVANIA.

NUT-LOCK.

SPECIFICATION forming part of Letters Patent No. 373,697, dated November 22, 1887.

Application filed March 2, 1887. Serial No. 229,413. (No model.)

*To all whom it may concern:*

Be it known that I, DAVID STEINER, a citizen of the United States, residing at Adamsburg, in the county of Westmoreland and State of Pennsylvania, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to nut-locks which have slides interposed between the sides of two adjacent nuts.

The improvement consists in having a metallic washer clamped between the fish-plate and the nut, and having a portion of the washer extended up alongside the nut for a short distance and then bent at right angles to the edge of the nut and projected away from said nut a short distance, forming a lip, which is located at a distance from and approximately parallel with the fish-rail for holding the locking-slide between it and the fish-rail, as will be more fully hereinafter set forth, claimed, and shown in the drawings, in which—

Figure 2:
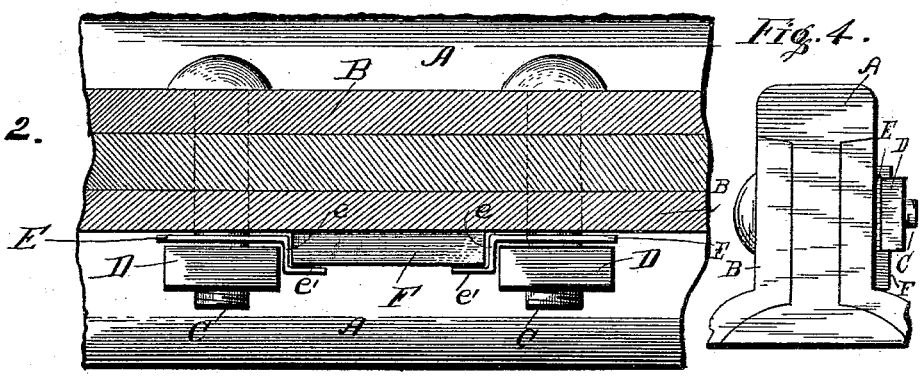
Figure 4:
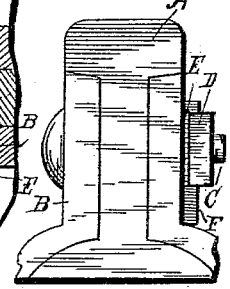
Figure 3:
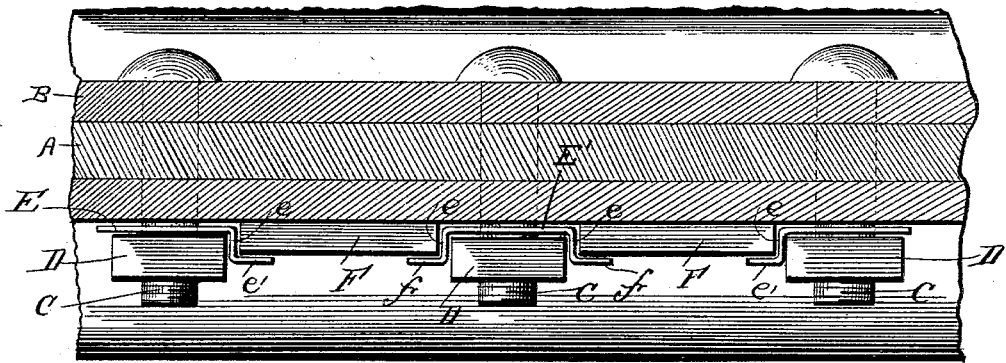

Figure 1 is a perspective view of a rail-joint embodying my invention. Fig. 2 is a horizontal section on the line *x x* of Fig. 1. Fig. 3 is a modification, and Fig. 4 is an end view of a rail of my invention.

The object of the invention is the production of a nut-lock which will be simple and can be applied and removed without requiring the attention of a skilled mechanic and which will be durable and easily managed.

The rail A, the fish-plate B, and the bolts C and nuts D are old and of well-known construction, and are shown simply as a means for carrying out my invention, which consists of the washer E, having a portion clamped between the nuts and the fish-plate, the portion *e*, extended up alongside the edge of the nut, and the portion *e'*, projecting at right angles to the edge of the nut and approximately parallel with the fish-plate, and the locking-slide F, slipped in between the sides of two adjacent nuts and held in place by the portions *e'*, which will be designated as retaining-lips. Where there are more than two nuts to be locked, the intermediate nut or nuts will have the washer E' (see Fig. 3) extending in opposite directions beyond the sides of, up along the edges of, and at right angles to the nut forming retaining-lips *f* on each side of the nut.

In practice the washers may be made so as to be of sufficient bulk to withstand the action of the atmosphere; but for ordinary purposes sheet metal cut in desired form will answer. The washer is first placed upon the bolt; then the nut is placed in position and screwed home. If the washer is already shaped, the nut and the washer will turn together; but if the washer is left flat, the nut alone will turn, and when screwed up tight the free end of the washer is turned out and over the locking-slide, which is placed in position, as will be readily understood. The locking-slide is held in position by the retaining-lips of the washers and is of sufficient length to rest upon the foot of the rail or the flange of the fish-plate.

I am aware that it is old to have a nut-locking device composed of a plate provided with a series of openings which are fitted over a corresponding series of nuts for locking them and held in place by a bolt passed through it near one end and a nut mounted on said bolt and having said end folded and a wedge held in the fold for locking said nut. It is also old to have winged washers clamped between the base and the nuts and to have an apertured plate fitted over the nuts and the wings of the washer bent down upon the plate on each side of the apertures for holding the plate in position. It is further old to have a slotted plate fitted over the nuts and held in place by straps of iron which are clamped in position at one end by the end nuts and have their free ends bent outward and over the ends of said plate. Such construction is not claimed, broadly, in that it is essentially different from mine, as specifically recited in the claims.

Having thus described my invention, what I claim, and desire to secure by Letters Patent, is—

1. The combination, with the two bolts, the nuts screwed thereon, and the washers mounted upon the bolts and held in place by the nuts, and provided with retaining-lips projected toward each other and at right angles to the edges of the nuts, of the locking-slide adapted to be slipped down between the approximate edges of the nuts and held in place by the retaining-lips, substantially as described.

2. The combination, with the three bolts, the nuts, and the washers mounted upon the bolts and held in place by the nuts, the end washers having retaining-lips projected toward the middle washer, and the middle washer having retaining-lips extended toward the end washers, substantially as shown, of the two independent locking-slides located on opposite sides of and between the middle and end washers and held in place by said retaining-lips, whereby one or both slides can be removed or replaced, substantially as set forth.

In testimony whereof I affix my signature in presence of two witnesses.

DAVID STEINER.

Witnesses:
ALEX. EICHER,
W. T. KING.